(12) United States Patent
Falkenburg et al.

(10) Patent No.: US 9,684,501 B2
(45) Date of Patent: Jun. 20, 2017

(54) ASSOCIATING A URL OR LINK BETWEEN TWO APPLICATIONS

(71) Applicant: Apple Inc., Cupertino, CA (US)

(72) Inventors: Steven J. Falkenburg, Los Altos, CA (US); Christopher S. Linn, Palo Alto, CA (US); Maciej Stachowiak, San Francisco, CA (US); Jonathan Grynspan, Santa Clara, CA (US); Andrew R. Whalley, San Francisco, CA (US); Robert Bradley, San Jose, CA (US); Samuel M. Weinig, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 21 days.

(21) Appl. No.: 14/732,612

(22) Filed: Jun. 5, 2015

(65) Prior Publication Data

US 2016/0357537 A1    Dec. 8, 2016

(51) Int. Cl.
*G06F 9/445* (2006.01)
*G06F 17/30* (2006.01)
*H04L 29/08* (2006.01)

(52) U.S. Cl.
CPC .......... *G06F 8/61* (2013.01); *G06F 17/30876* (2013.01); *H04L 67/06* (2013.01)

(58) Field of Classification Search
None
See application file for complete search history.

(56) References Cited

U.S. PATENT DOCUMENTS

| | | | |
|---|---|---|---|
| 6,546,554 B1 * | 4/2003 | Schmidt | G06F 8/61 709/201 |
| 7,140,014 B2 * | 11/2006 | Coryell | G06F 17/30893 707/E17.117 |
| 7,519,687 B2 * | 4/2009 | Tsuda | G06F 8/67 709/219 |
| 8,544,090 B1 * | 9/2013 | Chen | G06F 11/00 713/154 |
| 8,566,910 B2 | 10/2013 | Laitinen et al. | |
| 8,769,429 B2 * | 7/2014 | Refuah | G06F 17/30864 715/783 |

(Continued)

OTHER PUBLICATIONS

Deep Linking in iOS, Apr. 22, 2014, retrieved from the Internet: http://blog.originate.com/blog/2014/04/22/deeplinking-in-ios/.

(Continued)

*Primary Examiner* — Tuan Q. Dam
*Assistant Examiner* — Zheng Wei
(74) *Attorney, Agent, or Firm* — Blakely, Sokoloff, Taylor & Zafman LLP

(57) ABSTRACT

Methods and systems for associating, in a secure manner, a link between web sites (or other network resources) and installed applications. In one embodiment, a signed list of one or more URLs is downloaded and validated to establish an association, which is stored in a data structure, between a first application and a second application. In response to receiving a selection of a URL in the second application, comparing the selected URL to URLs in the data structure and displaying, in the first application, content of the selected URL in response to determining that at least a prefix portion of the selected URL matches one of the URL associated with the first application in the data structure.

29 Claims, 7 Drawing Sheets

(56) References Cited

U.S. PATENT DOCUMENTS

| | | | | |
|---|---|---|---|---|
| 8,838,643 B2* | 9/2014 | El Daher | .......... | G06F 17/30867 707/777 |
| 8,850,567 B1* | 9/2014 | Hsieh | .......... | H04L 63/1483 726/22 |
| 8,943,520 B1 | 1/2015 | Roka | | |
| 9,043,333 B1* | 5/2015 | Look | .......... | G06F 17/2235 707/744 |
| 9,135,211 B2* | 9/2015 | Stern | .......... | G06F 17/30 |
| 2004/0054671 A1* | 3/2004 | Cohen | .......... | G06F 17/30887 |
| 2005/0075101 A1* | 4/2005 | Tsuda | .......... | G06F 8/67 455/418 |
| 2006/0021031 A1* | 1/2006 | Leahy | .......... | C12N 5/0636 726/22 |
| 2006/0136902 A1* | 6/2006 | Monroe | .......... | G06F 8/60 717/170 |
| 2006/0242184 A1* | 10/2006 | Shur | .......... | G06F 17/30896 |
| 2008/0172343 A1* | 7/2008 | Juillet | .......... | G06Q 20/00 705/76 |
| 2008/0307091 A1* | 12/2008 | Sakamaki | .......... | G06F 17/30867 709/225 |
| 2010/0088696 A1* | 4/2010 | Stoev | .......... | H04L 67/04 717/178 |
| 2011/0161667 A1* | 6/2011 | Poornachandran | .......... | G06F 21/84 713/168 |
| 2011/0173602 A1* | 7/2011 | Togami | .......... | G06F 8/61 717/173 |
| 2011/0276961 A1* | 11/2011 | Johansson | .......... | G06F 8/61 717/178 |
| 2011/0289560 A1* | 11/2011 | Laitinen | .......... | H04L 9/3273 726/4 |
| 2011/0302269 A1* | 12/2011 | Keene | .......... | H04L 67/2823 709/217 |
| 2012/0054669 A1* | 3/2012 | Refuah | .......... | G06F 17/30864 715/783 |
| 2012/0159344 A1* | 6/2012 | Park | .......... | H04L 67/025 715/740 |
| 2012/0265809 A1* | 10/2012 | Hanson | .......... | H04L 67/141 709/204 |
| 2012/0311561 A1* | 12/2012 | Han | .......... | H04N 21/4586 717/176 |
| 2012/0324568 A1* | 12/2012 | Wyatt | .......... | G06F 21/51 726/13 |
| 2013/0031078 A1* | 1/2013 | El Daher | .......... | G06F 17/30867 707/706 |
| 2013/0047149 A1* | 2/2013 | Xu | .......... | G06F 8/61 717/175 |
| 2013/0104121 A1* | 4/2013 | Iwaya | .......... | G06F 8/61 717/174 |
| 2013/0262427 A1* | 10/2013 | Parsana | .......... | G06F 17/30864 707/706 |
| 2013/0339337 A1* | 12/2013 | Alkhateeb | .......... | G06F 17/30864 707/710 |
| 2013/0339487 A1 | 12/2013 | Wu | | |
| 2014/0129733 A1 | 5/2014 | Klais | | |
| 2014/0201178 A1* | 7/2014 | Baecke | .......... | G06F 17/30038 707/706 |
| 2014/0304678 A1* | 10/2014 | Zhang | .......... | G06F 8/38 717/105 |
| 2015/0040145 A1 | 2/2015 | Partridge et al. | | |
| 2015/0156061 A1 | 6/2015 | Saxena et al. | | |
| 2015/0215383 A1* | 7/2015 | Sun | .......... | G06F 17/3089 709/203 |
| 2015/0331957 A1* | 11/2015 | Elgebeely | .......... | G06F 17/30887 707/634 |
| 2015/0339274 A1* | 11/2015 | Pappu | .......... | G06F 17/2235 715/205 |
| 2016/0034238 A1* | 2/2016 | Gerlach | .......... | G06F 3/04817 345/1.1 |
| 2016/0034642 A1* | 2/2016 | Ehrhart | .......... | G06F 19/322 705/3 |
| 2016/0055133 A1* | 2/2016 | Look | .......... | G06Q 30/00 715/205 |
| 2016/0142517 A1* | 5/2016 | Chor | .......... | G06F 8/61 709/203 |

OTHER PUBLICATIONS

How to distribute enterprise iOS App, Mar. 15, 2015, retrieved from the Internet: https://github.com/nifcblm/AHPP-iOS-App/wiki/How-to-distribute-enterprise-iOS-App.

Mobile.deep.linking, May 12, 2015, retrieved from the Internet: https://web.archive.org/web/20150512001031/http://mobiledeeplinking.org/ retrieved on Jun. 10, 2016.

PCT International Search Report and Written Opinion of the International Searching Authority for PCT/US2016/026781 mailed Jun. 20, 2016.

\* cited by examiner

ASSOCIATING A URL OR LINK BETWEEN TWO APPLICATIONS

BACKGROUND OF THE INVENTION

Web pages on websites can often include links (e.g., URLs) to content that is related to or provided by apps (applications) provided or created by those websites. For example, Yelp's web pages present, in a web browser, reviews of restaurants, etc., and these same reviews can also be presented within Yelp's app which is a different program than a web browser. The Yelp app can be, for example, an app developed by Yelp and distributed by an app store, such as the Apple app store or other app stores that are known in the art. However, selection of a link from Yelp's web page within a web browser presents the view of the content from the link within the web browser rather than within Yelp's application even if the Yelp application is also installed on the same system which is executing the web browser.

SUMMARY OF THE DESCRIPTION

The embodiments described herein provide ways to associate a link, such as a URL, between two applications. In one embodiment, the association is created in a secure way such that a website (e.g., a domain) can control which apps are associated with the website and which portions of the website are permitted to be associated with one or more apps.

A method according to one embodiment can include the following operations to achieve this association: receiving a request to install a first application; downloading the first application to a device and downloading a list associated with the first application, the list specifying one or more URLs (Uniform Resource Locator) or URIs (Uniform Resource Identifier) in at least one domain specified in the list; installing the first application and downloading a signed list of one or more URLs or URIs; validating the signed list of URLs or URIs; storing, in a data structure, an association between the URLs or URIs in the signed list and the first application; receiving a selection of a URL or URI in a second application; comparing the selected URL or URI to URLs or URIs in the data structure; displaying, in the first application, content of the selected URL or URI in response to determining that at least a prefix portion of the selected URL or URI matches one of the URLs or URIs associated with the first application in the data structure. In one embodiment, the signed list of one or more URLs or URIs is downloaded from a server in the domain specified in the list, and the signed list is a cryptographically signed data structure which authenticates the list of URLs or URIs (in the signed list) as being authentic and authorized by the domain of the website. In one embodiment, a trusted system software component can validate the signed list before storing the URLs or URIs in an association with one or more applications including the first application such that the data structure can be considered to include only validated associations. In one embodiment, the list specifying the one or more URLs or URIs in the at least one domain is included in an entitlements property list of the first application. In one embodiment, the second application is a web browser or displays a web view which includes one or more active URLs or URIs, and the first application is distributed by an entity that controls or operates the domain. In one embodiment, the first application is distributed through an app store and is downloaded from the app store. In one embodiment, the domain controls the paths in the domain that are associated with the first application by limiting the URLs or URIs in the signed list of URLs or URIs. In one embodiment, the second application is a web browser and the content of the selected application is displayed in the second application, rather than the first application, if the selected URL or URI is in the domain. In one embodiment, a user selectable preference setting may be provided through a user interface that allows a user to disable displaying, in the first application, content from a URL or URI selected in the second application. In one embodiment, the first application and the second application run as separate processes in separate memory spaces controlled by a kernel of an operating system such that the first application and the second application are scheduled separately by a scheduler of the kernel.

The various embodiments described herein can be employed in methods and in systems that use these methods and in non-transitory machine readable storage media that store executable program instructions which when executed can cause a data processing system to perform any one or more of the methods described herein.

The above summary does not include an exhaustive list of all embodiments in this disclosure. All systems and methods can be practiced from all suitable combinations of the various aspects and embodiments summarized above, and also those disclosed in the Detailed Description below.

BRIEF DESCRIPTION OF THE DRAWINGS

The present invention is illustrated by way of example and not limitation in the figures of the accompanying drawings in which like references indicate similar elements.

DETAILED DESCRIPTION

Figure 1:
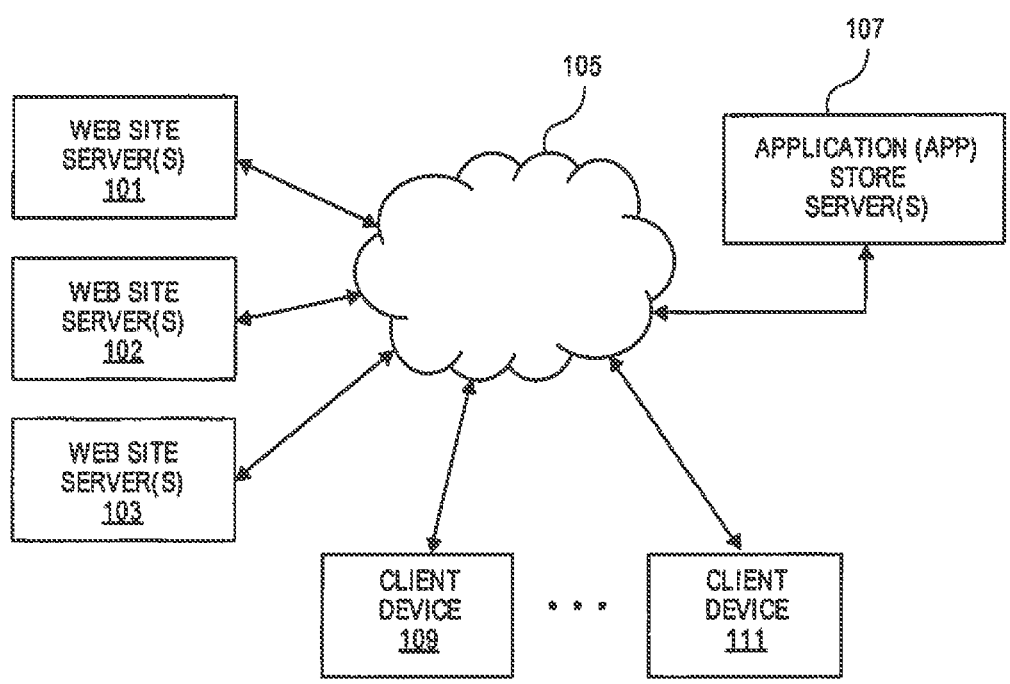
FIG. 1 shows an example of a collection of systems that can be interconnected to perform one or more of the methods described herein.

Various embodiments and aspects will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments.

Reference in the specification to "one embodiment" or "an embodiment" means that a particular feature, structure, or characteristic described in conjunction with the embodiment can be included in at least one embodiment. The appearances of the phrase "in one embodiment" in various places in the specification do not necessarily all refer to the same embodiment. The processes depicted in the figures that follow are performed by processing logic that comprises hardware (e.g. circuitry, dedicated logic, etc.), software, or a combination of both. Although the processes are described below in terms of some sequential operations, it should be appreciated that some of the operations described may be performed in a different order. Moreover, some operations may be performed in parallel rather than sequentially.

The embodiments described herein can provide a secure way for allowing a selection of a link in a first application to result in the display of the content from the link in a different, second application. In one embodiment, this can be referred to as a website to app association. For example, a user searches in a web browser app for a restaurant in, for example, a Yelp web page (on Yelp's website) and taps or clicks on a Yelp restaurant listing and instead of displaying the content of that restaurant listing in the web browser app, the content is displayed within the Yelp app that is also installed on the user's device, which can be a cell phone, smartphone, laptop computer or other data processing systems. In one embodiment, this method can work across two different applications through a verified list of entitlements included with the receiving or second application, which is the Yelp app in the example above. This list of entitlements can be included with the second app and processed when the second app is installed. The list of entitlements can be a list of URLs or URIs (Uniform Resource Identifier) in one embodiment. When the second (or receiving) app is installed or updated the list of domains (for example, Yelp.com) in the list of entitlements can be validated by downloading, for example, a signed JSON (Javascript Object Notation) file from a well-known location of each domain specified in the list of domains. The downloading of a cryptographically signed JSON file from an entity that controls the website's domain allows the websites to control which apps can be validly associated with the website and which certain paths in that domain are validly associated with the apps. In one embodiment, a premium version of an app may present more content and more paths or more parts of the domain than a non-premium version of the app. If the signed JSON file is determined to be authentic (indicating that it has been approved by the website) then the URLs or URIs in the signed JSON file are parsed and associated with the newly installed app and stored for use when the user selects the URLs or URIs in the first app to thereby cause the display of content of the URL or URI in the second app. It will be appreciated that a JSON file is one example of a data structure which contains machine readable text or similar content and that other types of data structures which contain text or similar content (e.g. plist or INI file, etc.) could alternatively be used with the embodiments described herein. It will also be appreciated that the JSON file (or other data structure) can contain URIs which specify addresses in computer memory (or other parameters) rather than an address or location on a network. When the user selects a URL or URI in the first app (in for example a web page or an email or a tweet), the system checks the selected URL or URI against a validated list of URLs or URIs, wherein each URL or URI in the validated list is associated with a receiving or second app that has been, in effect, approved for use (in the installation process) by that website (or owner of the URL in that domain). The URL or URI patterns are defined in the signed JSON file hosted by the domain so this allows only certain URLs or URIs in only certain paths in the signed JSON file to be handled by the app associated with the URLs or URIs in the signed JSON file. If the prefix of the selected URL or URI matches a prefix in the validated list and the associated app is installed (as it should be) then the associated app is opened or launched/opened and the content of the URL or URI is displayed in the second app. There can be in one embodiment a user selectable preference that can turn on or off this website to app association, and there can be warnings or prompts the first time that the associated app is opened to show content from a URL or URI selected within another app. In one embodiment, the second app is not a plug-in for the first app and runs as a separate process in separate memory spaces controlled by a kernel of an operating system such that the second application and the first application are scheduled separately by a scheduler of the kernel and are maintained in separate memory spaces or separate sandboxes. It will be understood that the use of the names of known companies or organizations (such as Yelp or BBC or ESPN) is done for purposes of explanation to provide examples of websites, apps, and domains that may be used with the one or more embodiments described herein, and that no endorsement or other similar commentary is being provided with respect to these named companies or organizations.

Figure 2:
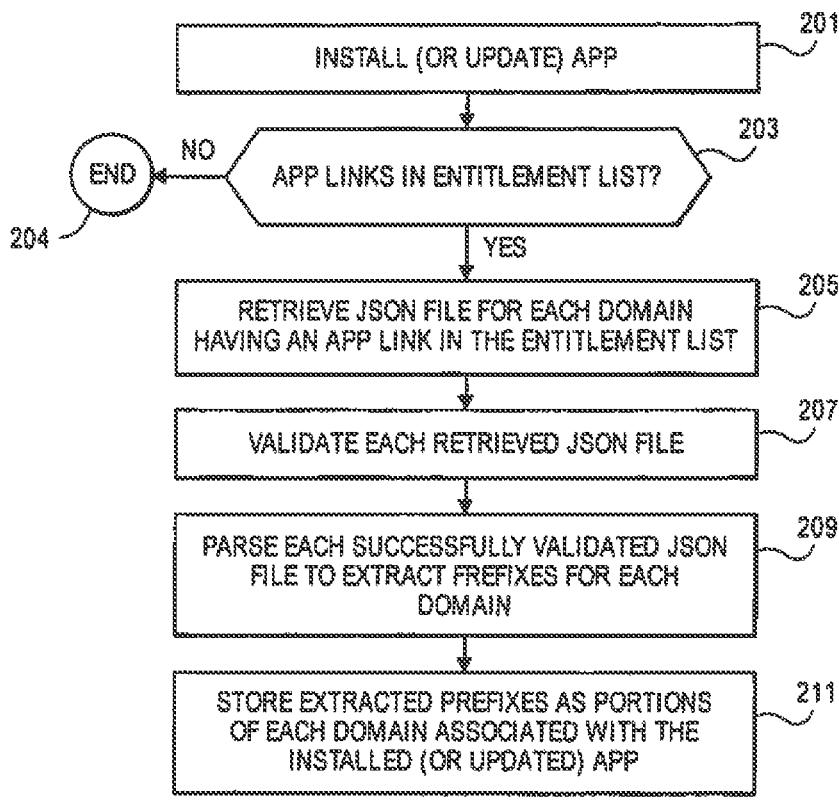
FIG. 2 shows a flowchart which depicts a method according to one embodiment described herein.
Figure 9:
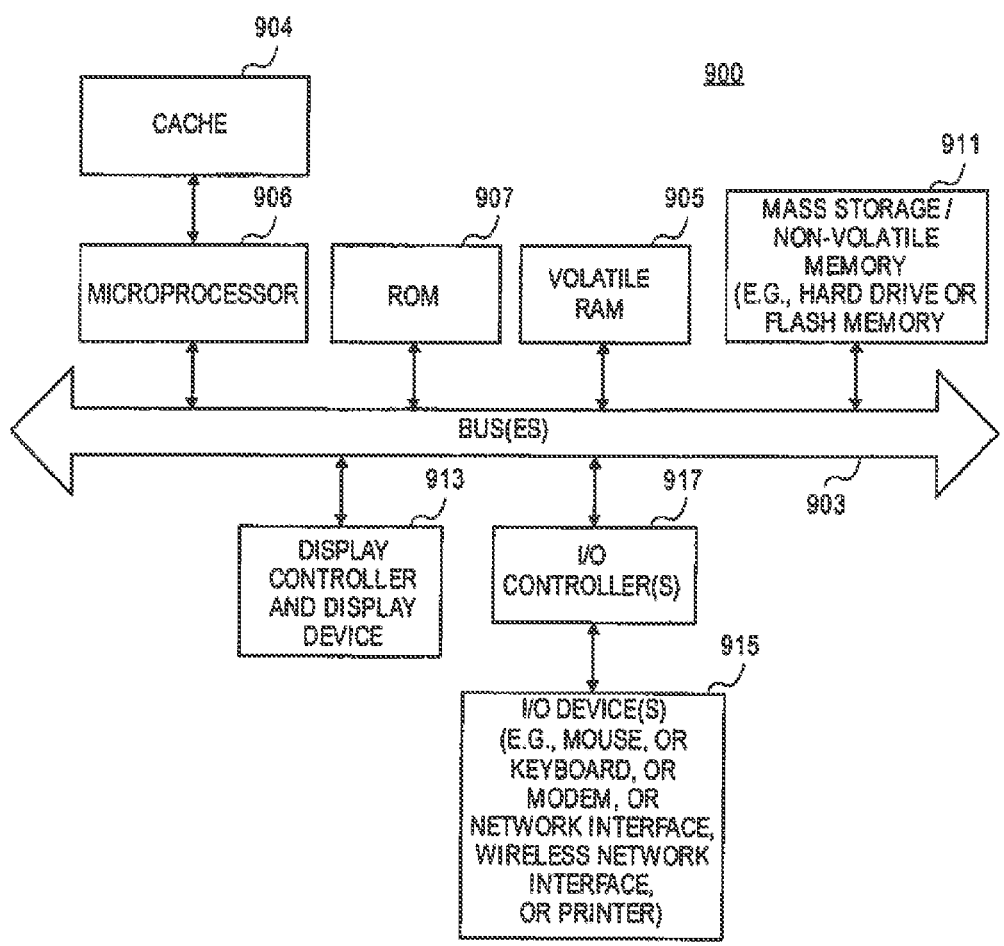
FIG. 9 shows one example of a data processing system which can be used with any one of the embodiments described herein.

FIG. 1 shows an example of the context for one or more of the embodiments described herein. A plurality of website servers or other web resources provided by servers are coupled through one or more networks, such as the Internet 105 to a plurality of client devices, such as client devices 109 and 111. Each website shown in FIG. 1 can be a distinct domain that is provided by a plurality of web servers, as is known in the art, which are provisioned to serve web content or other web resources from the domain. For example, the website servers 101 can be servers for the domain bbc.co.uk, and the website servers 102 can be the servers for the domain yelp.com, and the website servers 103 can be the servers for the domain espn.com. Each of these website servers (and other servers not shown) can serve web content and are coupled to the Internet 105 as is known in the art, and the Internet 105 in turn couples the client devices (e.g. devices 109 and 111) to these web servers using known protocols, such as the various http protocols and other known protocols. In addition, one or more application stores can be coupled to the Internet 105 to provide apps for downloading and installing onto the one or more client devices, such as client devices 109 and 111. As is known in the art, each client device can purchase or otherwise obtain apps from one or more app stores, such as app store servers 107 and cause those apps to be downloaded onto a client device as is known in the art. For example, a user of client device 109 can download an app from the BBC or ESPN or Yelp to install these apps, which are often associated with the corresponding websites (such as the BBC or ESPN or Yelp websites). The client devices 109 and 111 can be any one of a variety of data processing systems, such as smartphones, tablet computers, laptop computers, desktop computers, etc. FIG. 9 shows an example of an architecture for a data processing system which can be used to implement the client devices of FIG. 1 or the servers of FIG. 1, The method shown in FIG. 2 can be used to create an association between a website or other network resource and an application such as an app. The method can begin in operation 201 in which the app to be associated with the website or network resource is installed or updated. In one embodiment, the app can be installed from an app store from which the app is downloaded or it can be installed from a storage device such as a CD ROM or other storage devices containing the app. The installation process in operation 201 can be the initial installation where the app does not previously exist on the device or can be an update of the app where the app is being changed from the previous version of the app to a newer or modified version of the app. During the installation process, operation 203, in one embodiment, can be performed in which the installer software component (or other software component) determines whether or not there are app links in an entitlement list. In one embodiment, the entitlement list is downloaded with the app and can be part of the app bundle or can be separately provided in another embodiment.

Figure 3:
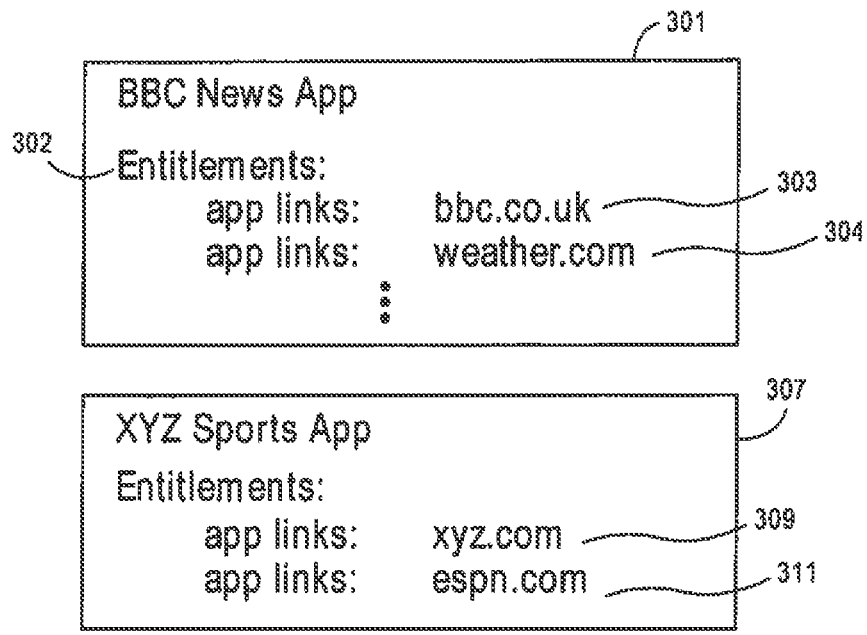
FIG. 3 shows two examples of entitlement lists which can be used to create an association between a website or other web resource and one or more applications installed on a data processing system.

FIG. 3 shows two examples of two entitlement lists 301 and 307. Each entitlement list can include a list of entitlements, such as entitlements 302, and one set of entitlements can be one or more app links. Each app link, such as app links 303, 304, 309, and 311, each specify a domain which the app is requesting to be associated with the app. For example, in the case of the BBC news app shown in FIG. 3, it lists two app links 303 and 304 which it requests to be associated with the BBC news app such that at least a portion of the domain specified by the app links is to be associated with the BBC news app. Similarly, the XYZ sports app lists two app links 309 and 311 specifying two separate domains which are requested to be associated with the XYZ sports app. In particular, app link 309 specifies the domain XYZ which presumably is the website owner which created the XYZ sports app. Similarly, the XYZ sports app asserts in app link 311 a request to associate with the espn.com domain shown by the app link 311.

Returning back to FIG. 2, it can be seen from that figure that if there are no app links specified in an entitlement list for the app, then processing (of app links for the app) ends in operation 204. On the other hand if the app links are present, as shown for example in FIG. 3, then in operation 205 the installer or some other operating system component retrieves a signed file for each domain having an app link in the entitlement list. In one embodiment, the signed file can be, for example, a JSON file which has been cryptographically signed by each domain to authenticate the JSON file as coming from the domain. The JSON file in one embodiment can be retrieved from known locations of a domain based on rules that can be established as to paths from which the JSON file can be retrieved. In one embodiment, if the JSON file has a time to live parameter (e.g., time-to-live parameter 414) which indicates that the existing JSON file has expired, the system can retrieve an updated JSON file (and this can occur when the app is updated, such as in operation 201). This allows the website or domain to control the association over time allowing the association to change depending on the needs of the domain and the app that may be associated with the domain.

Figure 4:
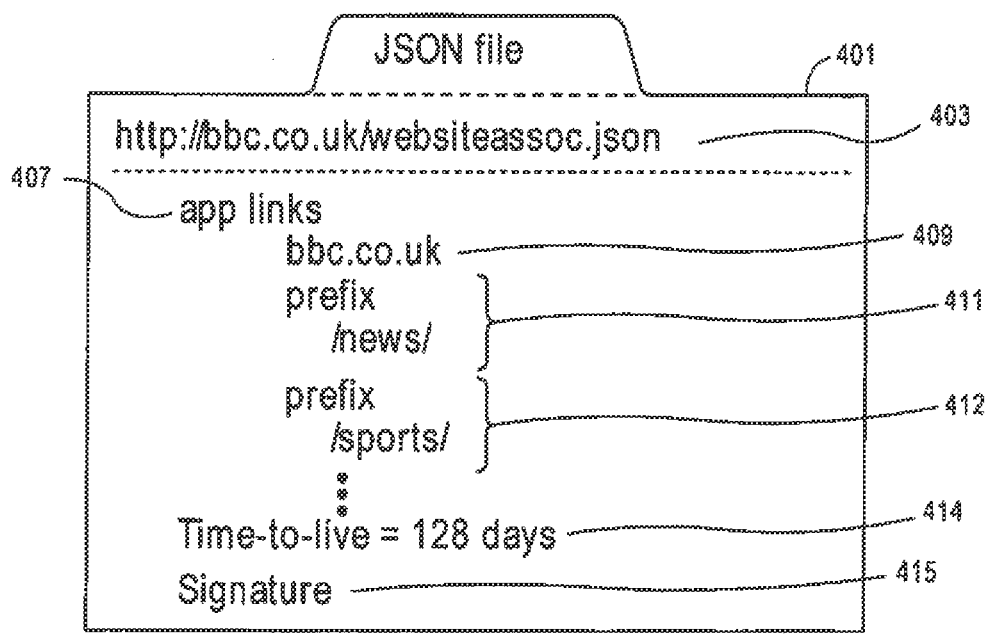
FIG. 4 shows an example of a signed file which can be used to validate a list URLs which can be associated with one or more applications as described herein.

FIG. 4 shows an example of a JSON file obtained from a particular domain. JSON file 401 can include URL or URI 403 which specifies the URL or URI from which to retrieve the JSON file; this may be optional component (in the JSON file) which may not be present in all JSON files. JSON file 401 also includes one or more app links, such as app links 407 which specify a domain 409 and prefix portions of the domain, such as prefix portions 411 and 412 which are used during the parsing process (in operation 209) to create particular paths within the domain for which an app is to be associated. In the case of JSON file 401 shown in FIG. 4, two portions (specified by prefix portions 411 and 412) of the bbc.co.uk domain are to be associated with an app or application. JSON file 401 can also include a time to live parameter (such as time-to-live parameter 414) which specifies how long the JSON the is authorized to be valid. JSON file 401 can also include a signature 415 which is added to or appended to the file and which can be used by a client data processing system to validate (for example, in operation 207 of FIG. 2) the authenticity of the file or the content of the file as being authentic and authorized by the domain from which it was downloaded. In one embodiment, the signature 415 can be a cryptographic signature using techniques which are known in the art to allow JSON file 401 to be validated as authentic from and authorized by the domain from which it was downloaded. This signature can, therefore, allow the domain to control which apps can be associated with the website of the domain and which certain paths in the domain are authorized to be associated with the app. When the installer software and operating system software of a client device use a signed JSON file to create associations owned and authorized by a website, it is possible for the website to thereby control which applications or apps can be associated with the website and which portions of the domain are authorized to be associated with the app.

Returning to FIG. 2, operation 207 can validate each retrieved JSON file from each domain. Various known cryptographic techniques may be used to sign and to validate each JSON file. For example, in one embodiment the signature can be created by hashing the content (excluding the signature) of the JSON file with a known one-way hash algorithm and the result of that hash is then encrypted with the private key of the domain to create the signature which is then appended to the content of the JSON file. When a client device receives the signed file (from the domain), it can decrypt the signature using the public key of the domain which returns the hash of the content of the JSON file. The client device can then compute its own hash of the content using the same known one-way hash and compare its computed hash value to the hash value retrieved by decrypting the signature with the public key from a domain. Other well-known techniques may be used to validate each JSON file. This validation process can be performed at installation time (or at first run time) by a trusted system software component so that all apps and websites can rely on the trusted system software (which is distinct from the installed apps) to perform a secure and trusted validation that cannot be controlled by the app being installed. After each JSON file has been validated in operation 207, the contents of each JSON file are parsed in operation 209 to extract the prefixes for each domain. These prefixes can then be stored in a data structure, such as the data structure shown in FIG. 5 which shows the association between websites or other network resources and one or more apps on a data processing system. Operation 211 can be performed by a service on the client device which stores these associations in a system-wide data structure which is available to all apps operating on the system. The system-wide data structure can be managed by a trusted software component (such as an operating system component) of the client data processing system to ensure the integrity of the data structure after the associations have been stored in the data structure. The extracted prefixes stored in the data structure, such as data structure 501, specify those portions of each domain which are associated with the installed or updated app. This association allows the selection of a deep link (in a website of a domain) within a first app, such as a web browser, to cause the display of content from the deep link in a second application without having to navigate through home pages or other pages in a hierarchy of the website.

Figure 5:
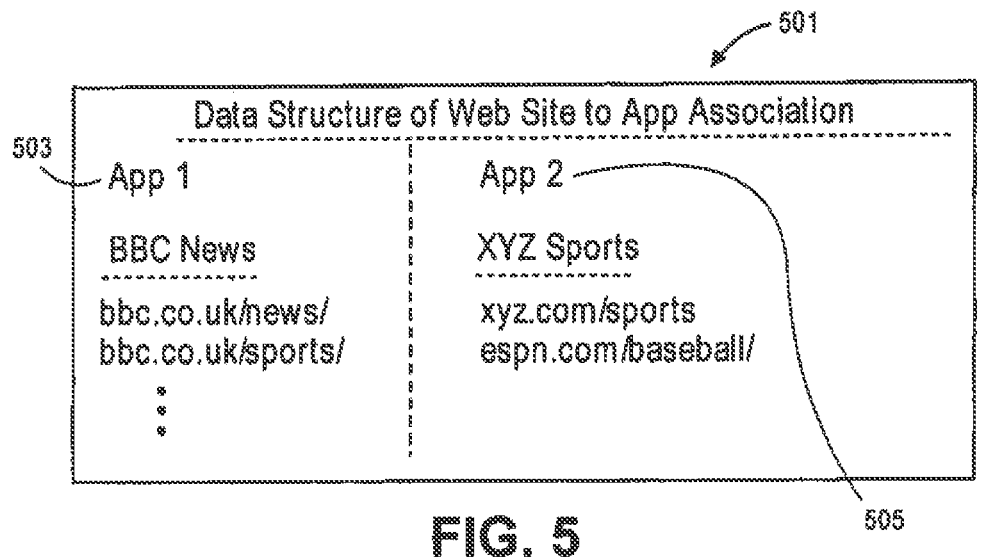
FIG. 5 shows an example of a data structure which shows an association between one or more apps and at least portions of domains, such as websites.

The data structure 501 shown in FIG. 5 is an example of how a software installer in conjunction with an operating system can create a data structure which indicates associations between websites or other network resources and one or more apps installed on a data processing system, such as a smartphone. The data structure 501 includes extracted URL or URI prefixes specifying four portions of three different domains for two different apps. In particular, for app 503, which is labeled as app 1 (the BBC News app) there are two extracted prefixes for the domain bbc.co.uk which was derived from one JSON file downloaded from the bbc.co.uk domain. In the case of app 2, (which is shown as app 505, or "XYZ sports" app) it is associated with specified portions of two different domains which were derived from two different JSON files downloaded in the manner described with respect to the method shown in FIG. 2. This data structure 501 can be read or searched in response to the selection of a link in an operation, such as operation 707 shown in FIG. 7 or operation 803 shown in FIG. 8. By searching this data structure, the system can determine whether content selected through a link should be displayed within the application presently displaying the link or in a different application according to the methods described herein.

Figure 6:
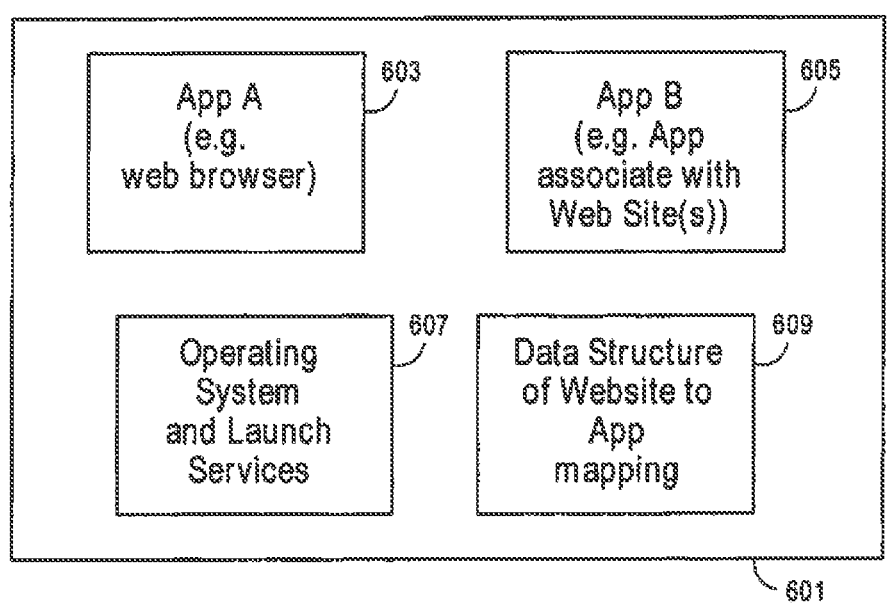
FIG. 6 shows an example of memory on a data processing system according to one embodiment described herein.

FIG. 6 shows the contents of memory in one embodiment of a data processing system, such as a client system that has installed at least two applications and has created a data structure, such as the data structure 501 which associates websites apps through a mapping. In particular, memory 601 can be a combination of DRAM and non-volatile memory of a client device and can include a plurality of applications such as app A (which can be a web browser) and app B which can be one of the apps listed in the data structure 609 which in one embodiment can be the data structure 501 which specifies a mapping or association between websites and apps. The data structure 609 is created, in one embodiment, during the installation of the apps by installer software or other operating system components and then is used later by the operating system components and launch services software components to cause the display of content from a link selected in one application within a different application. Application A (application 603) is an example of the first application displaying a link which is selected which can then, according to the methods described herein, cause the display of content within a different application, such as application B (application 605) shown in FIG. 6. It will be appreciated that application B (application 605) can be considered to be one of the two applications shown in data structure 501 in FIG. 5. In one embodiment, operating system and launch services 607 interact with the app 603 and app 605 to perform the method shown in FIG. 7 and FIG. 8 by utilizing the data structure 609 which can be similar to the data structure 501 shown in FIG. 5. Examples of methods for utilizing data structure 609 will now be provided in conjunction with FIGS. 7 and 8.

Figure 7:
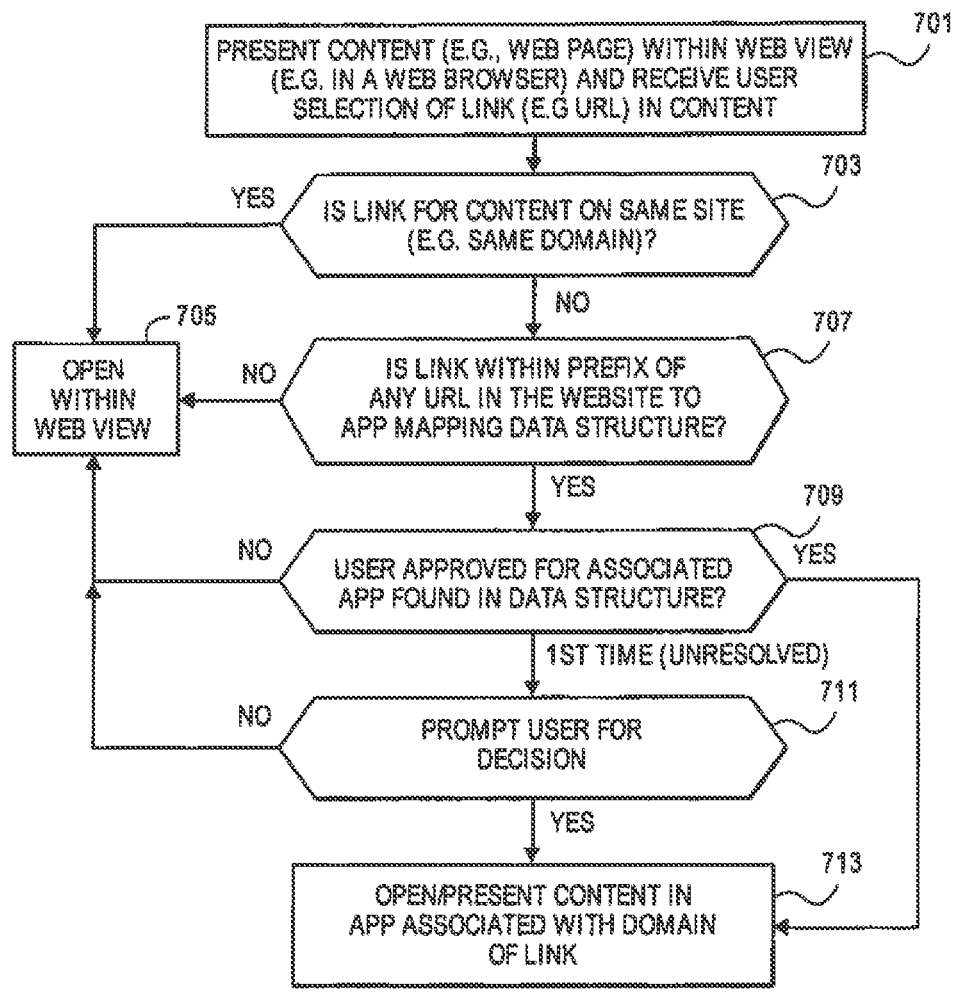
FIG. 7 is a flowchart which illustrates a method according to one embodiment which can utilize the associations in a data structure such as the data structure shown in FIG. 5.

In FIG. 7, a method can begin in operation 701 in which content is presented within a web view, such as within a web browser which receives a user selection of a link, such as a URL or URI, in content displayed within the web browser. In one embodiment, the web browser can be app 603 executing in a client data processing system which has installed one or more apps that can be associated with links displayed in the content. In response to the selection, the method shown in FIG. 7 can proceed to operation 703 which is an optional operation in one embodiment. In operation 703, it is determined whether the link for the content is on the same site, such as the same domain as the content displayed in operation 701. If it is, then processing proceeds to operation 705 in which the content is opened within the web view (rather than launching or opening a different application). Optional operation 703 may be desirable in those cases where it is perceived that users will want to remain on the domain or website that they are currently browsing and not change to a different app. If in operation 703 it is determined that the link is for content on a different site or different domain then operation 707 follows; in operation 707, it is determined whether the link is within a prefix of any URL in the website to app mapping data structure, such as data structure 501 or data structure 609. If the link is riot within the prefixes of any URL or URI in such data structure then processing proceeds to operation 705 in which the content is displayed within the web view of the web browser which displayed the content in operation 701. On the other hand, if the link is within a prefix of a URL or URI listed in the data structure then processing proceeds to operation 709 in which it is determined whether the user has approved the use of the associated app found in the data structure in this circumstance. The user's approval for associating are app with a link can be provided through a user preference or user setting in a preference panel or other user interface which can be provided on a per app basis. For example, a settings panel or page can be presented which shows all the possible apps, each of which can be selected to present settings for the app and one of those settings for an app can be whether or not to allow for association of the app with links found in the data structures created as described herein, such as the data structure 501. If the user has selected no for the setting, then processing will proceed to operation 705 in which the content is displayed within the web view of the web browser which was also displaying the content in operation 701. On the other hand, if the user has indicated that the use of such association is approved, then processing proceeds to operation 713 in which the content obtained from the link is presented in a different app which is indicated by the association in the data structure 501 or other data structures created according to the methods described herein. This is shown as operation 713 in which the content is displayed in the different app. In one embodiment, the operating system and launch services may be called upon to launch or open this different app to display the content from the link. In one embodiment, operation 711 may be performed the first time that the app is encountered in the data structure and no user preference has been set by the user. In particular, if no user preference has been set by the user and this is the first time that the app has been encountered in the website to app data structure, process 709 can be followed by operation 711 in which the user is prompted for a decision with respect to whether or not to allow the association which would cause the content to be presented within the app which is different than the web browser which presented the link in operation 701. If the user selects yes from the prompt displayed by operation 711, then operation 713 follows in which the content is presented within the app Which is different than the web browser which displayed the link in operation 701. On the other hand if the user selected no in operation 711, then the content is presented within the web view in operation 705 It will be appreciated that in certain embodiments operations 709 and 711 may be considered optional and hence not be performed; one or both of operations 709 and 711 may be considered optional.

Figure 8:
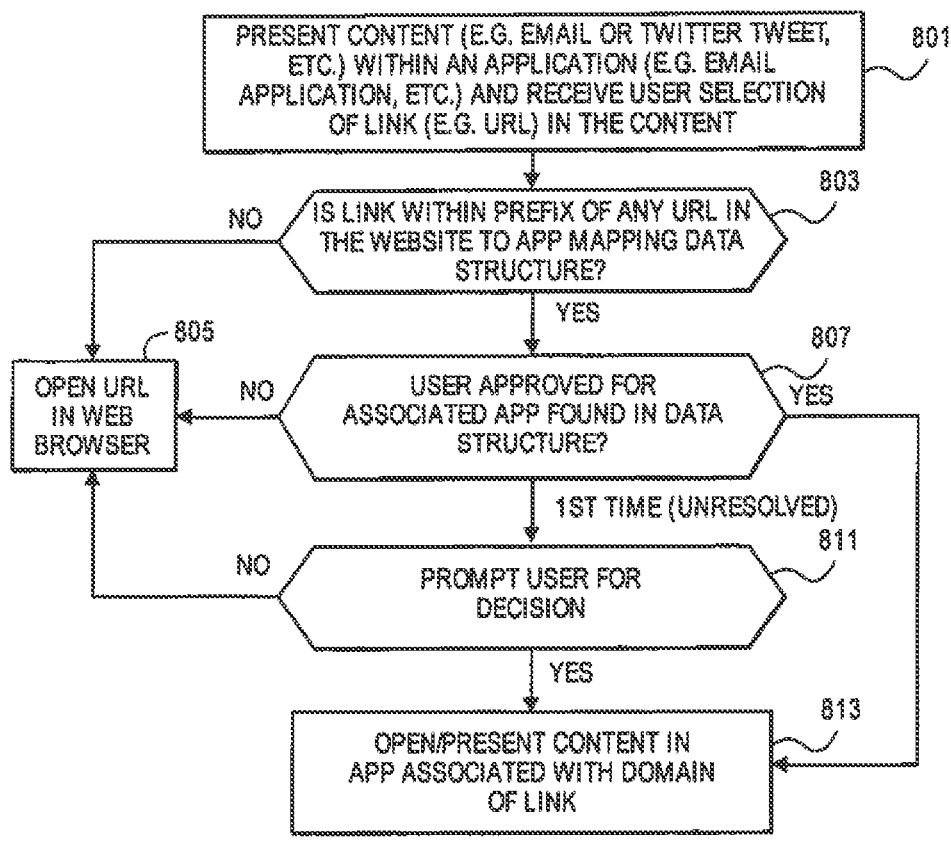
FIG. 8 is a flowchart which shows another embodiment of a method described herein.

FIG. 8 shows a method according to another embodiment in which the content having the link is presented in an application other than the web browser application. For example the content may be an email content or a twitter tweet content or other content presented within an application which normally presents such content, such as an email application, etc. That content includes a link which the user can select in operation 801 causing operation 803 to be performed in which the link is compared with the prefixes of any URL, in the website to app mapping data structure, such as the data structure 501 described above. If the link is not present in the data structure, then the link is opened in a web browser in operation 805, otherwise processing proceeds to operation 807 in which it is determined whether the user has approved for the use of the associated app found in the data structure. If the user has indicated by selecting a preference setting that the use is not approved then processing proceeds to operation 805 in which the URL or URI is opened in web browser in operation 805. On the other hand if the user has approved for the use of the associated app found in the data structure then operation 813 follows in which the content of the URL or URI is presented in the app associated with the domain of the link. For example, if the email displayed in an email application includes a URL or URI to a Yelp web page and the user selects that link and the user has approved for the use of the Yelp app for displaying content within the Yelp domain, then the Yelp app will be launched or opened in operation 813 to show the content of the link on the Yelp website. In the case where a user has not established a setting and has not previously caused this app to be invoked through the association then operation 811 follows operation 807. In operation 811 the user is prompted for a decision with respect to the use of an app associated with the link presented in operation 801. The user can select no causing the link to be opened in the web browser in operation 805, and lithe user selects yes then the link will be used to retrieve and present the content in the app associated with the domain of the link as specified in the website to app mapping data structure, such as the data structure 501 described above. It will be appreciate that one or both of the operations 807 and 811 can be considered optional and therefore deleted from any method relating to the embodiment shown in FIG. 8.

The foregoing embodiments can provide a secure mechanism for allowing a selection of a link in one application to result in the display of content from the link in a different application where the websites or domains can control that association between the different applications. This can be used to prevent hijacking or other schemes which could allow malware to create associations which are not authorized by a domain.

FIG. 9 shows one example of a data processing system, which may be used with any one of the embodiments described herein. Note that while FIG. 9 illustrates various components of a data processing system, it is not intended to represent any particular architecture or manner of interconnecting the components as such details are not germane to this description. It will also be appreciated that network computers, tablet computers, smartphones, laptop computers, desktop computers, other consumer electronic devices and other data processing systems which have fewer components or perhaps more components may also be used with one or more embodiments described herein.

As shown in FIG. 9, the computer system 900, which is a form of a data processing system, includes a bus 903 which is coupled to one or more microprocessor(s) 906 and a ROM (Read Only Memory) 907 and volatile RAM 905 and a non-volatile memory 911. The microprocessor 906 is coupled to optional cache 904. The microprocessor 906 may have one or more cores that may retrieve the stored instructions from one or more of the memories 907, 905 and 911 and execute the instructions to perform operations described above. These memories represent examples of machine readable non-transitory storage media that can store or contain computer program instructions which when executed cause a data processing system to perform the one or more methods described herein. The bus 903 interconnects these various components together and also interconnects these components 905, 906, 907, and 911 to a display controller and display device 913 and to peripheral devices such as input/output (I/O) devices 915 which may be one or more of mice, touch screens, touch pads, touch sensitive input devices, keyboards, modems, network interfaces, printers and other devices which are well known in the art. Typically, the input/output devices 915 are coupled to the system through input/output controllers 917. The volatile RAM (Random Access Memory) 905 is typically implemented as dynamic RAM (DRAM) which requires power continually in order to refresh or maintain the data in the memory.

The mass storage 911 is typically a magnetic hard drive or a magnetic optical drive or an optical drive or a DVD RAM or a flash memory (e.g. a solid state drive implemented with flash memory) or other types of memory system which maintain data (e.g., large amounts of data) even after power is removed from the system. Typically the mass storage 911 will also be a random access memory although this is not required. While FIG. 9 shows that the mass storage 911 is a local device coupled directly to the rest of the components in the data processing system, it will be appreciated that one or more embodiments may utilize a non-volatile memory which is remote from the system, such as a network storage device which is coupled to the data processing system through a network interface such as a modem, an Ethernet interface or a wireless network. The bus 903 may include one or more buses connected to each other through various bridges, controllers and/or adapters as is well known in the art.

In the foregoing specification, specific exemplary embodiments have been described. It will be evident that various modifications may be made to those embodiments without departing from the broader spirit and scope set forth in the following claims. The specification and drawings are, accordingly, to be regarded in an illustrative sense rather than a restrictive sense.

What is claimed is:

1. A machine readable non-transitory medium storing instructions which when executed by a data processing system cause the data processing system to perform a method comprising:
   receiving a request to install a first application;
   downloading, in response to the request to install, the first application to a device and downloading, in response to the request to install, a list associated with the first application, the list specifying one or more URIs (Uniform Resource Identifier) in at least one domain;
   installing the first application and downloading a signed list of one or more URIs based on the downloaded list associated with the first application;
   validating the signed list of URIs;
   storing, in a data structure, an association between the URIs in the signed list and the first application;
   receiving a selection of a URI in a second application;
   comparing the selected URI to URIs in the data structure;

displaying, in the first application, content of the selected URI in response to determining that at least a prefix portion of the selected URI matches one of the URIs associated with the first application in the data structure.

2. The medium as in claim 1 wherein the signed list of one or more URIs is downloaded from a server in the domain and the signed list is cryptographically signed by the domain to authenticate the list of URIs in the signed list.

3. The medium as in claim 1 wherein a system software component validates the signed list before storing the URIs in an association with one or more applications including the first application.

4. The medium as in claim 3 wherein the list specifying one or more URIs in the at least one domain is included in an entitlements property list of the first application.

5. The medium as in claim 1 wherein the second application is a web browser or displays a web view or one or more active URIs and the first application is distributed by an entity that controls or operates the domain.

6. The medium as in claim 5 wherein the signed list of URIs is contained in a Javascript Object Notation (JSON) file and wherein the signed list of URIs is a signed list of URLs.

7. The medium as in claim 5 wherein the first application is distributed through an app store and is downloaded from the app store.

8. The medium as in claim 5 wherein the domain controls the paths in the domain that are associated with the first application by limiting the URIs in the signed list of URIs.

9. The medium as in claim 1 wherein the signed list is cryptographically signed by the domain to authenticate the list of URIs in the signed list, and the signed list has a specified and limited time to live.

10. The medium as in claim 1 wherein the second application is a web browser and wherein the content of the selected URI is displayed in the second application, rather than the first application, if the selected URI is in the domain.

11. The medium as in claim 1 wherein a user selectable preference setting allows a user to disable displaying, in the first application, content from a URI selected in the second application.

12. The medium as in claim 1 wherein the first application and the second application run as separate processes in separate memory spaces controlled by a kernel of an operating system such that the first application and the second application are scheduled separately by a scheduler of the kernel.

13. A machine implemented method comprising:
receiving a request to install a first application;
downloading, in response to the request to install, the first application to a device and downloading, in response to the request to install, a list associated with the first application, the list specifying one or more URIs (Uniform Resource Identifier) in at least one domain;
installing the first application and downloading a signed list of one or more URIs based on the downloaded list associated with the first application;
validating the signed list of URIs;
storing, in a data structure, an association between the URIs in the signed list and the first application;
receiving a selection of a URI in a second application;
comparing the selected URI to URIs in the data structure;
displaying, in the first application, content of the selected URI in response to determining that at least a prefix portion of the selected URI matches one of the URIs associated with the first application in the data structure.

14. The method as in claim 13 wherein the signed list of one or more URIs is downloaded from a server in the domain and the signed list is cryptographically signed by the domain to authenticate the list of URIs in the signed list.

15. The method as in claim 13 wherein a system software component validates the signed list before storing the URIs in an association with one or more applications including the first application.

16. The method as in claim 15 wherein the list specifying one or more URIs in the at least one domain is included in an entitlements property list of the first application.

17. The method as in claim 13 wherein the second application is a web browser or displays a web view or one or more active URIs and the first application is distributed by an entity that controls or operates the domain.

18. The method as in claim 17 wherein the signed list of URIs is contained in a Javascript Object Notation (JSON) file and wherein the signed list of URIs is a signed list of URLs.

19. The method as in claim 17 wherein the first application is distributed through an app store and is downloaded from the app store.

20. The method as in claim 17 wherein the domain controls the paths in the domain that are associated with the first application by limiting the URIs in the signed list of URIs.

21. The method as in claim 13 wherein the signed list is cryptographically signed by the domain to authenticate the list of URIs in the signed list, and the signed list has a specified and limited time to live.

22. The method as in claim 13 wherein the second application is a web browser and wherein the content of the selected URI is displayed in the second application, rather than the first application, if the selected URI is in the domain.

23. The method as in claim 13 wherein a user selectable preference setting allows a user to disable displaying, in the first application, content from a URI selected in the second application.

24. The method as in claim 13 wherein the first application and the second application run as separate processes in separate memory spaces controlled by a kernel of an operating system such that the first application and the second application are scheduled separately by a scheduler of the kernel.

25. A machine readable non-transitory medium storing instructions which when executed by a data processing system cause the data processing system to perform a method comprising:
receiving a request to install a first application on the data processing system;
downloading, to the data processing system, the first application and downloading, to the data processing system, a list associated with the first application, the list specifying one or more URIs (Uniform Resource Identifier) in at least one domain;
installing the first application on the data processing system;
validating the list of URIs;
storing, in a data structure on the data processing system, an association between the URIs in the list and the First application, the data structure being stored in response to installing the first application;
receiving a selection of a URI in a second application;

comparing the selected URI to URIs in the data structure;

displaying, in the first application, content of the selected URI in response to determining that at least a prefix portion of the selected URI matches one of the URIs associated with the first application in the data structure.

26. The medium as in claim 25 wherein the list of one or more URIs is downloaded from a server in the domain and the list is cryptographically signed by the domain to authenticate the list of URIs in the list.

27. The medium as in claim 25 wherein a system software component validates the list before storing the URIs in an association with one or more applications including the first application.

28. The medium as in claim 25 wherein the second application is a web browser or displays a web view or one or more active URIs and the first application is distributed by an entity that controls or operates the domain.

29. The medium as in claim 26 wherein the domain controls the paths in the domain that are associated with the first application by limiting the URIs in the list of URIs.

* * * * *